United States Patent
Spurlock

(10) Patent No.: US 10,834,109 B2
(45) Date of Patent: Nov. 10, 2020

(54) DETERMINING A REPUTATION FOR A PROCESS

(71) Applicant: McAfee, LLC, San Jose, CA (US)

(72) Inventor: Joel R. Spurlock, Portland, OR (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 14/581,439

(22) Filed: Dec. 23, 2014

(65) Prior Publication Data

US 2016/0182550 A1  Jun. 23, 2016

(51) Int. Cl.
*H04L 29/06* (2006.01)
*G06F 21/56* (2013.01)
*G06F 21/57* (2013.01)

(52) U.S. Cl.
CPC ........ *H04L 63/1425* (2013.01); *G06F 21/566* (2013.01); *G06F 21/57* (2013.01)

(58) Field of Classification Search
CPC .......................... H04L 63/1425; G06F 25/566
See application file for complete search history.

(56) References Cited

U.S. PATENT DOCUMENTS

| | | | | |
|---|---|---|---|---|
| 5,050,070 A | * | 9/1991 | Chastain | G06F 9/3004 712/203 |
| 5,097,533 A | * | 3/1992 | Burger | G06F 8/76 712/E9.082 |
| 5,138,713 A | * | 8/1992 | Loten | G06F 9/52 714/819 |
| 5,197,130 A | * | 3/1993 | Chen | G06F 8/433 710/40 |
| 5,987,610 A | | 11/1999 | Franczek et al. | |
| 6,073,142 A | | 6/2000 | Geiger et al. | |
| 6,460,050 B1 | | 10/2002 | Pace et al. | |
| 7,506,155 B1 | | 3/2009 | Stewart et al. | |
| 8,225,406 B1 | | 7/2012 | Nachenberg | |
| 8,321,516 B2 | | 11/2012 | Sargent et al. | |
| 8,839,432 B1 | | 9/2014 | Patil | |
| 8,904,520 B1 | | 12/2014 | Nachenberg et al. | |
| 2008/0072049 A1 | * | 3/2008 | Cross | G06F 21/51 713/176 |
| 2009/0319998 A1 | | 12/2009 | Sobel et al. | |
| 2010/0005291 A1 | | 1/2010 | Hulten et al. | |
| 2010/0005528 A1 | * | 1/2010 | Teller | G06F 21/54 726/22 |
| 2010/0077445 A1 | * | 3/2010 | Schneider | G06F 21/52 726/1 |
| 2011/0185423 A1 | | 7/2011 | Sallam | |

(Continued)

OTHER PUBLICATIONS

Machine Translation of: CN Aug. 17, 2020 Second Office Action from counterpart Chinese Application CN201580076745.9; 4 pages.*

(Continued)

*Primary Examiner* — Ellen Tran
(74) *Attorney, Agent, or Firm* — Patent Capital Group

(57) ABSTRACT

Particular embodiments described herein provide for an electronic device that can be configured to identify a process running on the electronic device, assign a reputation to the process if the process has a known reputation, determine if the process includes executable code, determine a reputation for the executable code, and combine the reputation for the executable code with the reputation assigned to the process to create a new reputation for the process.

25 Claims, 13 Drawing Sheets

(56) References Cited

U.S. PATENT DOCUMENTS

| | | | | |
|---|---|---|---|---|
| 2011/0225655 A1* | 9/2011 | Niemela | ............... | G06F 21/566 726/24 |
| 2012/0005729 A1* | 1/2012 | Amitai | ................. | H04L 63/102 726/4 |
| 2012/0192275 A1* | 7/2012 | Oliver | .................... | G06F 21/51 726/24 |
| 2015/0096018 A1* | 4/2015 | Mircescu | ............... | G06F 21/56 726/23 |

OTHER PUBLICATIONS

International Search Report and Written Opinion in International Application No. PCT/US2015/062575, dated Apr. 19, 2016, 12 pages.
EPO Jun. 13, 2018 Extended European Search Report in counterpart European Application No. 15874028.2; 9 pages.
EPO Apr. 12, 2019 Communication in counterpart European Application No. 15874028.2; 6 pages.
CN Nov. 28, 2019 First Office Action from counterpart Chinese Application CN201580076745.9; 8 pages.
CN Aug. 17, 2020 Second Office Action from counterpart Chinese Application CN201580076745.9; 3 pages [No English translation available].

* cited by examiner

US 10,834,109 B2

DETERMINING A REPUTATION FOR A PROCESS

TECHNICAL FIELD

This disclosure relates in general to the field of information security, and more particularly, to determining a reputation for a process.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The figures of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
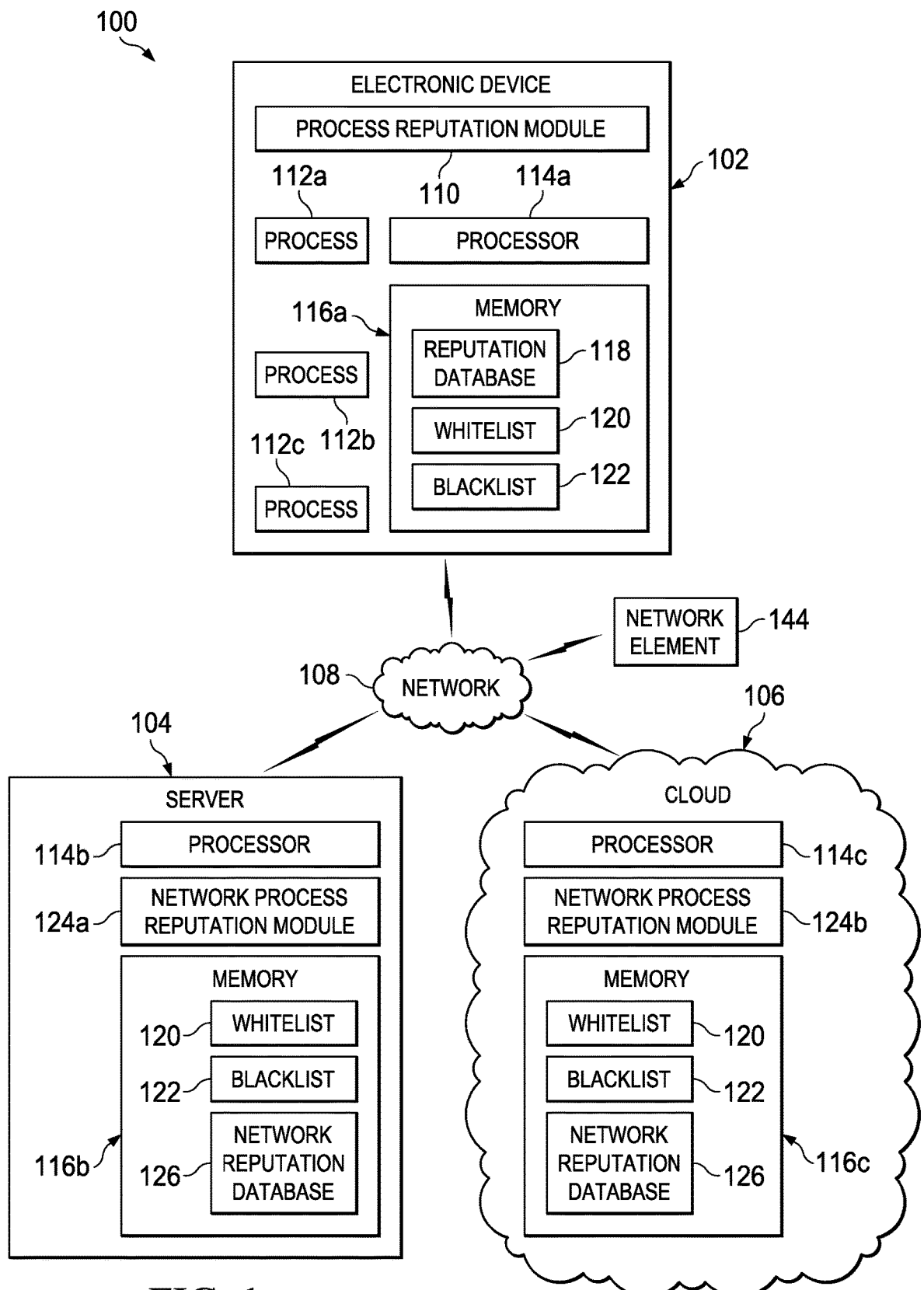
FIG. 1 is a simplified block diagram of a communication system for determining a reputation for a process in accordance with an embodiment of the present disclosure.

FIG. 1 is a simplified block diagram of a communication system 100 for determining a reputation (or trust level) for a process in accordance with an embodiment of the present disclosure. As illustrated in FIG. 1, an embodiment of communication system 100 can include electronic device 102, a server 104, and a cloud 106. Electronic device 102 can include a process reputation module 110, one or more process 112a, 112b, and 112c, a processor 114a, and memory 116a. In one example, memory 116a may include a reputation database 118, a whitelist 120, and a blacklist 122. Server 104 can include a processor 114b, memory 116b, and a network process reputation module 124a. Memory 116b can include whitelist 120, blacklist 122, and a network reputation database 126. Cloud 106 can include a processor 114c, memory 116c, and a network process reputation module 124b. Memory 116c can include whitelist 120, blacklist 122, and network reputation database 126. Electronic device 102, server 104, and cloud 106 may be in communication using network 108. Network element 144 can be any network element that communicates or interacts with electronic device through network 108.

In example embodiments, communication system 100 can be configured to determine a reputation for one or more processes such as processes 112a, 112b, and 112c. The reputation for each process can be determined independently. For example, communication system 100 can be configured to establish a target or base process reputation from primary executable functions associated with process 112a (e.g., the main function that is used to execute the process, for example notepad.exe), primary executable functions associated with process 112b, and primary executable functions associated with process 112c.

Events on electronic device 102 can be observed or monitored by process reputation module 110 and the reputation of each processes 112a, 112b, and 112c can be update as objects modify each process, electronic device 102, or the system or environment where each process is located or operates. Communication system 100 can also be configured to support the concept of an object having a changed reputation which can then retroactively affect the reputation of processes 112a, 112b, and 112c as a whole or individually. For example, malware may affect the reputation of process 112a but not affect the reputation of process 112b and only minimally affect the reputation of process 112c.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Often it is necessary to state, fully track, and know the reputation of a process at any given time. The reputation of a process can be an algorithmic aggregation of the code running within the process context, including all threads and memory areas in addition to interpreted content such as scripts. The reputation should be update over time as additional events flow through the system and additional reputation data is discovered about the modules running in the process space. The reputation of a process can be very useful as it is a source of data to help detect malware, protect critical resources and exfiltration of data, and protect computers and computer networks from malicious and inadvertent exploitation by malicious software and devices.

A communication system that can determine a reputation for a process, as outlined in FIG. 1 can resolve these issues (and others). In an example, process reputation module 110 can be configured to establish a target or base process reputation for a process. More specifically, process reputation module 110 can monitor events in the system such as library load, attach thread, write process memory, etc and if such an event occurs, the process's reputation can be modified to include the reputation of the event. For example, the process's reputation can be modified to be a merge of the reputation of the process and the reputation of a file library which is being loaded. Also, if an actor process causes an attach thread event to the process, the process's reputation can be modified to a merge of the process's reputation and the reputation of the actor process. Further, if an actor process causes a write process memory event to the process, the process's reputation can be modified to a merge of the process's reputation and the reputation of the actor process. In addition, if a process reads or interprets a content file, the process's reputation can be modified to a merge of the process's reputation and the reputation of the content file that is being read. One example may tie the content file type to the process as an interpreter such that if the process cannot actually read that file type then it does not affect the process's reputation. Also, if the process contacts a URL and the URL can be determined to have a reputation, the process's reputation can be modified to a merge of the process's reputation with the reputation of the URL. In addition, if the process contacts an IP address and the IP address can be determined to have a reputation, the process's reputation can be modified to a merge of the process's reputation and the reputation of the IP address. Further, an end user or user interacting with the process may have a reputation and the process's reputation can be modified to a merge of the process's reputation with the reputation of user. For example, a senior IT employee with high clearance may have a very high reputation while a junior IT employee or a non-IT employee may have a very low reputation.

The above examples are provided only as illustrative examples, other examples may be used and are clearly within the scope of this disclosure. Generally, if an event occurs which can be determined to affect the reputation of a process, the process's reputation can be modified to a merge of the process's reputation and the reputation of the new event. In this way, behavior analysis of a process can be performed after the process has started executing and the analysis of the behavior can be used to modify the reputation of the process. For example, attempting to modify the memory of Windows® processes could be determined to be a malicious event and a process's reputation could be set to the merge of the reputation of the event and the process's reputation. The reputation of loaded objects can be monitored for the lifetime of the process and the process's reputation can be update to the reputation of an object change. For example, if a library is loaded into a process, and that library is identified to have a malicious reputation after the load library event has occurred, then the process's reputation can be updated to reflect malicious reputation.

There are a variety of ways to merge reputations or combine reputations and all are within the scope of this disclosure. For example, a value may be used to store an indication of the reputation of a process. The reputation may be represented by an integer between 0 and 100, where 100 represents the most trusted reputation and 0 represents a malicious reputation with 50 being a true unknown reputation. The reputations of a process and actor processor or some other event can be merged using an average of the two reputations or an algorithmic mechanisms that can include rules or a weighted average algorithm.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, server 104, and cloud 106 can include memory elements (memory 116a-116c) for storing information to be used in the operations outlined herein. Each of electronic device 102, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102, server 104, and cloud 106 of communication system 100, may include software modules (e.g., process reputation module 110 and network process reputation modules 124a and 124b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102, server 104, and cloud 106 may include a processor (e.g., processor 114a-114c) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although network process reputation modules 124a and 124b are represented in FIG. 1 as being located in server 104 or cloud 106, this is for illustrative purposes only. Network process reputation modules 124a and 124b could be combined or separated in any suitable configuration. Furthermore, network process reputation modules 124a and 124b could be integrated with or distributed in another network accessible by server 104 or cloud 106. Cloud 106 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
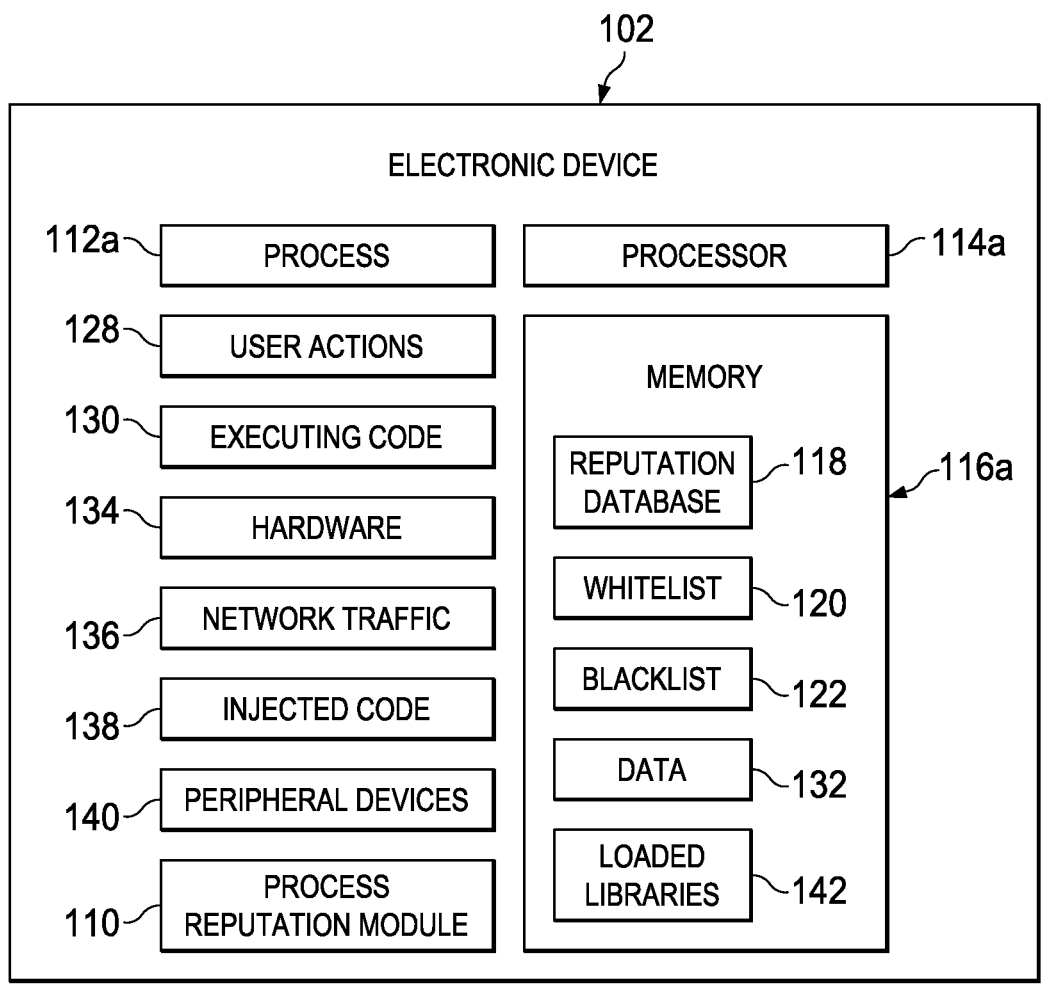
FIG. 2 is a simplified block diagram of a portion of a communication system in accordance with an embodiment of the present disclosure.

Turning to FIG. 2, FIG. 2 is a simplified block diagram of a portion of a communication system 100 that includes electronic device 102. Electronic device 102 can include process reputation module 110, process 112a, processor 114a, memory 116a, user actions 128, executing code 130, hardware 134, network traffic 136, injected code 138, and peripheral devices 140. Memory 116a can include reputation database 118, whitelist 120, blacklist 122, data 132, and loaded libraries 142. Whitelist 120 can include known reputable or trusted applications and processes. Blacklist 122 can include know unreputable or untrusted applications and processes. Reputation database 118 can include a reputation of processes not included in whitelist 120 or blacklist 122. Process reputation module 110 can use whitelist 120, blacklist 122, and reputation database 118 to help determine a reputation for a process.

User actions 128 represents actions that may be taken by a user, such as visiting a malicious URL or installing untrusted data on electronic device 102. If any user actions 128 modify process 112a, then the reputation of the user actions that modified process 112*a* can be merged with the reputation of process 112*a*. Executing code 130 represents code executing on electronic device 102. If any executing code 130 modifies process 112*a*, then the reputation of executing code that modified process 112*a* can be merged with the reputation of process 112*a*. Hardware 134 represents hardware connected to electronic device 102. If any hardware 134 modifies process 112*a*, then the reputation of the hardware that modified process 112*a* can be merged with the reputation of process 112*a*. Network traffic 136 represents network traffic that may be sent or received by electronic device 102. If any network traffic 136 modifies process 112*a*, then the reputation of the network traffic that modified process 112*a* can be merged with the reputation of process 112*a*. Injected code 138 represents code injected into a process in electronic device 102. If any injected code 138 modifies process 112*a*, then the reputation of the injected code that modified process 112*a* can be merged with the reputation of process 112*a*. Peripheral devices 140 represents peripheral devices that are connected to electronic device 102. If any peripheral devices 140 modify process 112*a*, then the reputation of peripheral device that modified process 112*a* can be merged with the reputation of process 112*a*. Data 132 represents data that is included in electronic device 102. If any data 132 modifies process 112*a*, then the reputation of the data that modified process 112*a* can be merged with the reputation of process 112*a*. Loaded libraries 142 represents libraries loaded on electronic device. If any loaded libraries 142 modify process 112*a*, then the reputation of loaded libraries that modified process 112*a* can be merged with the reputation of process 112*a*. The above are only illustrative examples and other similar examples are clearly within the scope of this disclosure.

Figure 3:
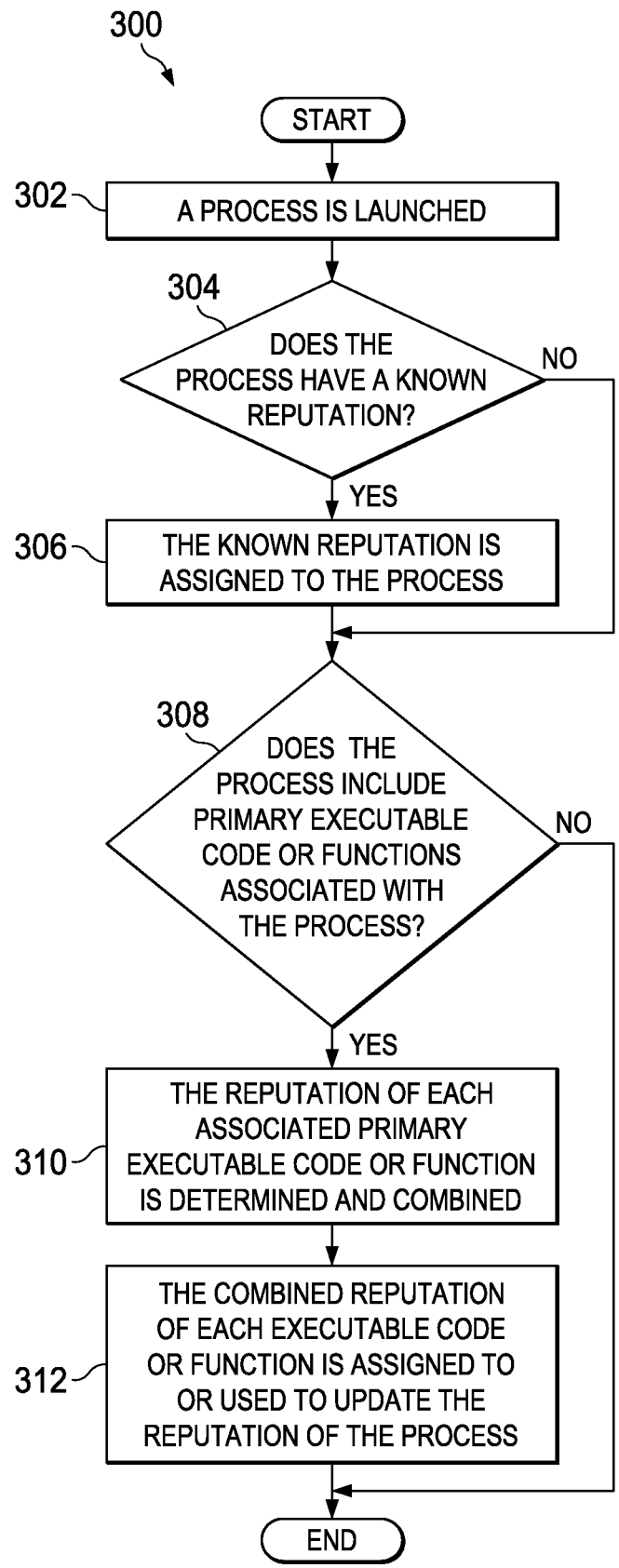
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with determining a reputation for a process, in accordance with an embodiment. In an embodiment, one or more operations of flow 300 may be performed by process reputation module 110. At 302, a process is launched. At 304, the system determines if the process has a known reputation. For example, the process may match in entry in whitelist 120, blacklist 122, or reputation database. If the process does not have a known reputation, then the system determines if the process includes primary executable code or functions associated with the process, as in 308. If the process does have a known reputation, then the known reputation is assigned to the process, as in 306. At 308, the system determines if the process includes primary executable code or functions associated with the process. If the process does not include primary executable code or functions associated with the process, then the flow ends. If the process does include primary executable code or functions, then the reputation of each associated primary executable code or function is determined and combined, as in 310. At 312, the combined reputation of each executable code or function is assigned to or used to update the reputation of the process.

Figure 4:
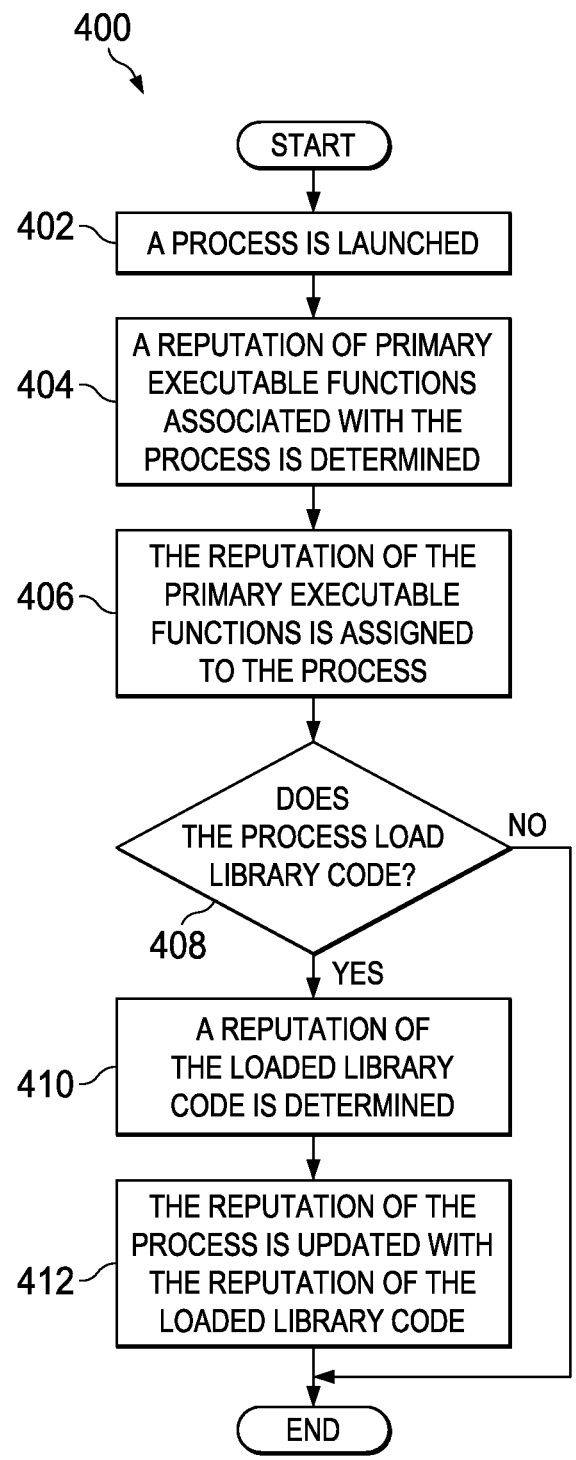
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with determining a reputation for a process, in accordance with an embodiment. In an embodiment, one or more operations of flow 400 may be performed by process reputation module 110. At 402, a process is launched. At 404 a reputation of primary executable functions associated with the process is determined. At 406, the reputation of the primary executable functions is assigned to the process. At 408, the system determines if the process loads library codes. For example, process 122*a* may execute code loaded from loaded libraries 142. If the process does not load library codes, then the flow stops. If the process does load library codes, then a reputation of the loaded library code (or the reputation for each loaded library code) is determined, as in 410. At 412, the reputation of the process is updated with the reputation of the loaded library code (or each library code).

Figure 5:
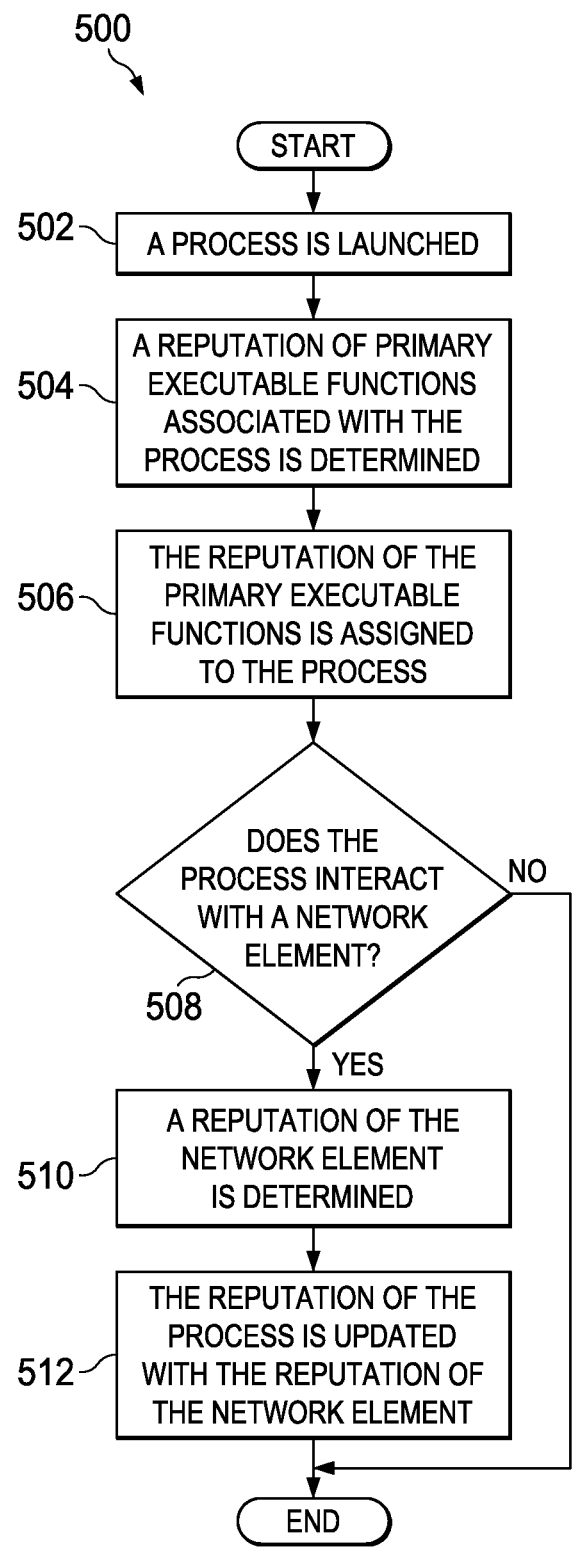
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with determining a reputation for a process, in accordance with an embodiment. In an embodiment, one or more operations of flow 500 may be performed by process reputation module 110. At 502, a process is launched. At 504 a reputation of primary executable functions associated with the process is determined. At 506, the reputation of the primary executable functions is assigned to the process. At 508, the system determines if the process interacts with a network element. For example, process 112*a* may interact with network element 144. If the process does not interact with a network element, then the flow stops. If the process does interact with a network element, then a reputation of the network element is determined, as in 510. At 512, the reputation of the process is updated with the reputation of the network element.

Figure 6:
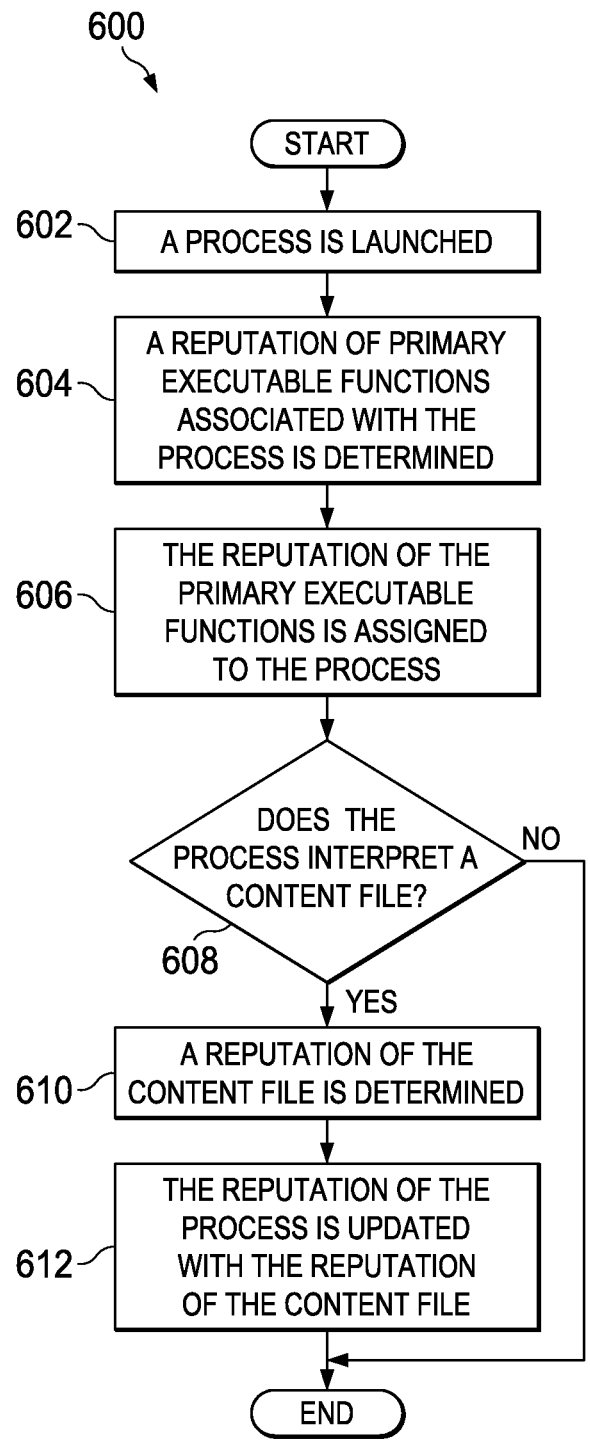
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with determining a reputation for a process, in accordance with an embodiment. In an embodiment, one or more operations of flow 600 may be performed by process reputation module 110. At 602, a process is launched. At 604 a reputation of primary executable functions associated with the process is determined. At 606, the reputation of the primary executable functions is assigned to the process. At 608, the system determines if the process interprets a content file. For example, process 122*a* may be a PDF reader displaying a PDF document or a script interpreter executing a script. If the process does not interpret a content file, then the flow stops. If the process does interpret a content file, then a reputation of the content file is determined, as in 610. At 612, the reputation of the process is updated with the reputation of the content file.

Figure 7:
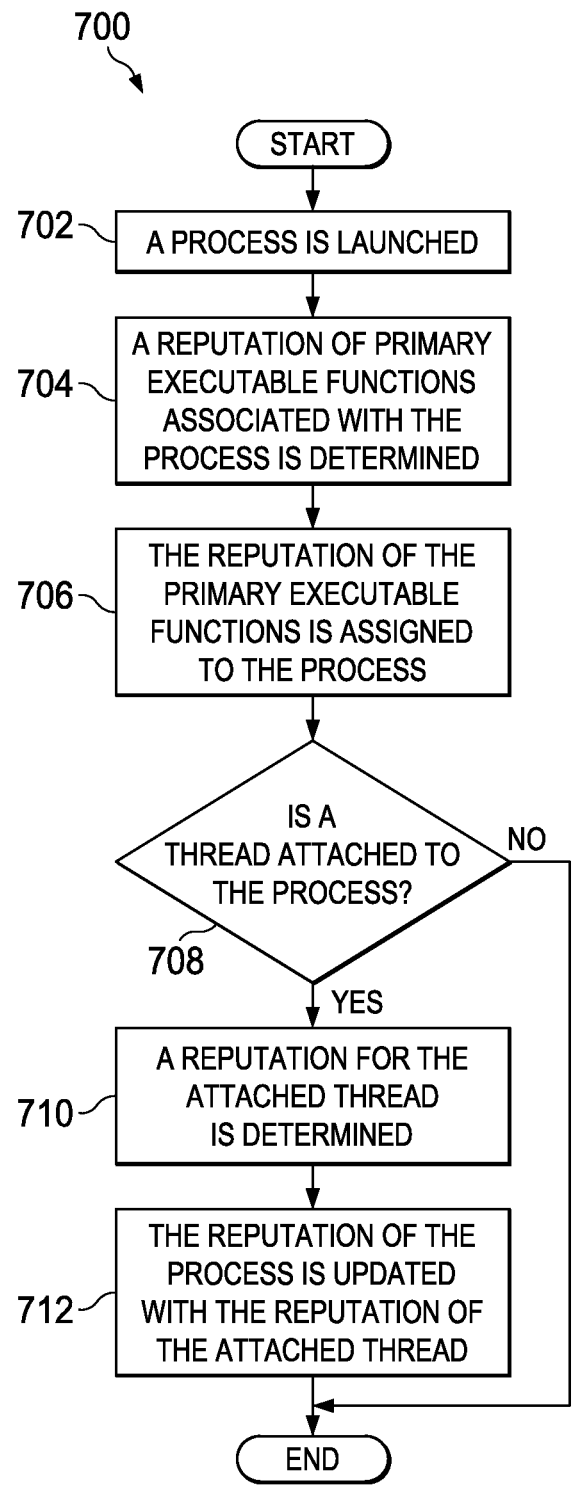
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with determining a reputation for a process, in accordance with an embodiment. In an embodiment, one or more operations of flow 700 may be performed by process reputation module 110. At 702, a process is launched. At 704 a reputation of primary executable functions associated with the process is determined. At 706, the reputation of the primary executable functions is assigned to the process. At 708, the system determines if a thread is attached to the process. For example, process 122*a* may create a thread with malicious code and then attach that thread to process 122*b*, which in effect hides the behaviors of process 122*a* under process 122*a* and allows process 122*a* to bypass firewall rules. If a thread is not attached to the process, then the flow stops. If a thread is attached to the process, then a reputation for the attached thread is determined, as in 710. At 712, the reputation of the process is updated with the reputation of the attached thread.

Figure 8:
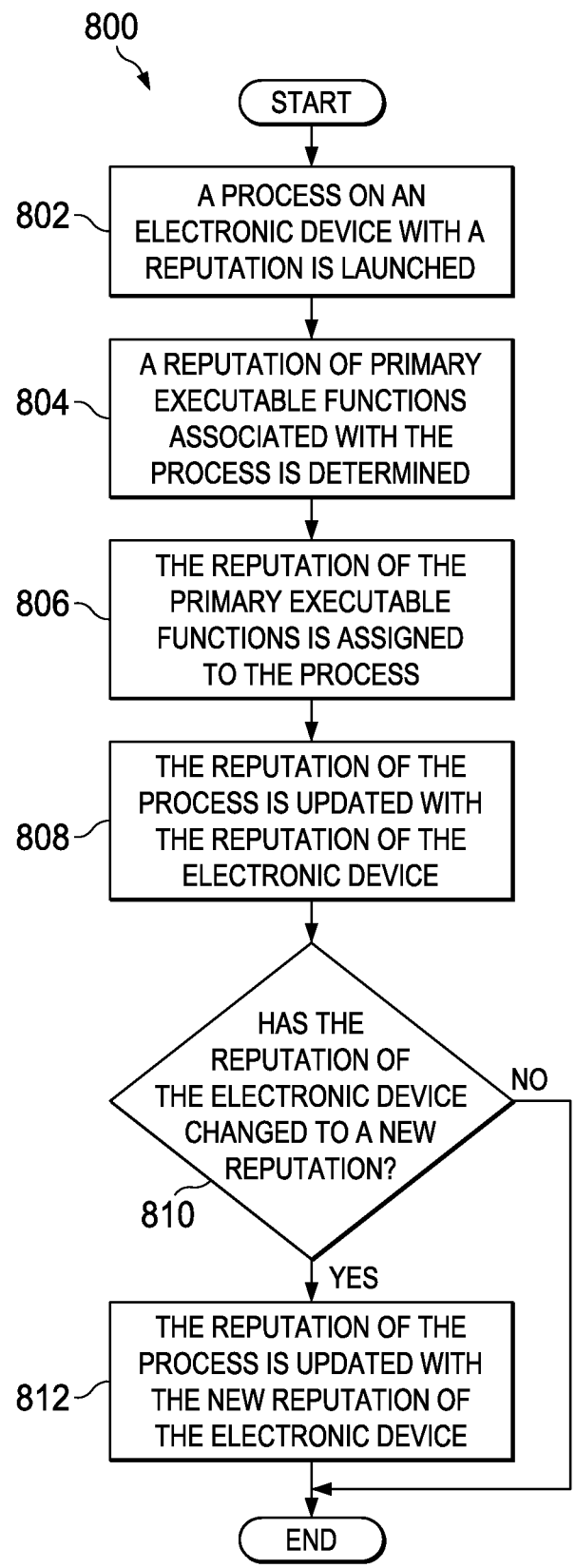
FIG. 8 is a simplified flowchart illustrating potential operations that may be associated with the communication system in accordance with an embodiment.

Turning to FIG. 8, FIG. 8 is an example flowchart illustrating possible operations of a flow 800 that may be associated with determining a reputation for a process, in accordance with an embodiment. In an embodiment, one or more operations of flow 800 may be performed by process reputation module 110. At 802, a process on an electronic device with a reputation is launched. At 804 a reputation of primary executable functions associated with the process is determined. At 806, the reputation of the primary executable functions is assigned to the process. At 808, the reputation of the process is updated with the reputation of the electronic device. At 810, the system determines if the reputation of the electronic device has changed to a new reputation. For example, process 122a may be running on electronic device 102 and electronic device may have been infected by malware. If the reputation of the electronic device has not changed to a new reputation, then the flow stops. If the reputation of the electronic device has changed to a new reputation, then the reputation of the process is updated with the new reputation of the electronic device, as in 812

Figure 9:
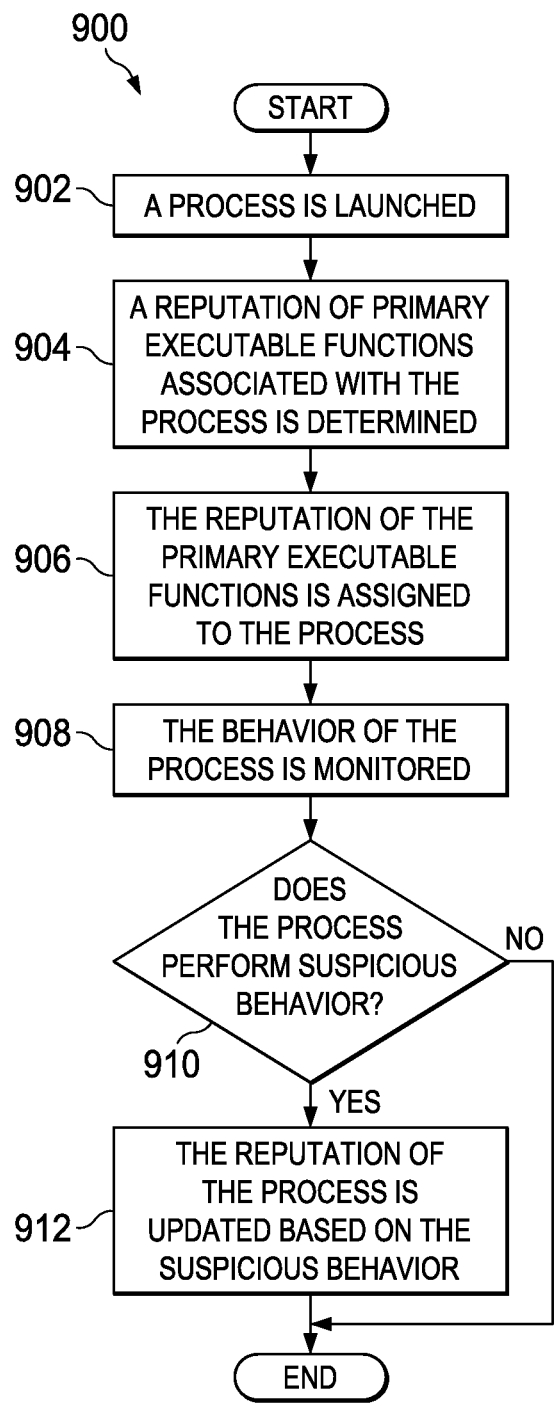
FIG. 9 is a simplified flowchart illustrating potential operations that may be associated with the communication system in accordance with an embodiment.

Turning to FIG. 9, FIG. 9 is an example flowchart illustrating possible operations of a flow 900 that may be associated with determining a reputation for a process, in accordance with an embodiment. In an embodiment, one or more operations of flow 900 may be performed by process reputation module 110. At 902, a process is launched. At 904 a reputation of primary executable functions associated with the process is determined. At 906, the reputation of the primary executable functions is assigned to the process. At 908, the behavior of the process is monitored. At 910, the system determines if the process performs suspicious behavior. For example, process 122a may be monitored to see if it performs any suspicious activity such as accessing a port or area of memory that process 122a does not normally access. If the process does not perform any suspicious behavior, then the flow stops. If the process does perform suspicious behavior, then the reputation of the process is updated based on the suspicious behavior, as in 912.

Figure 10:
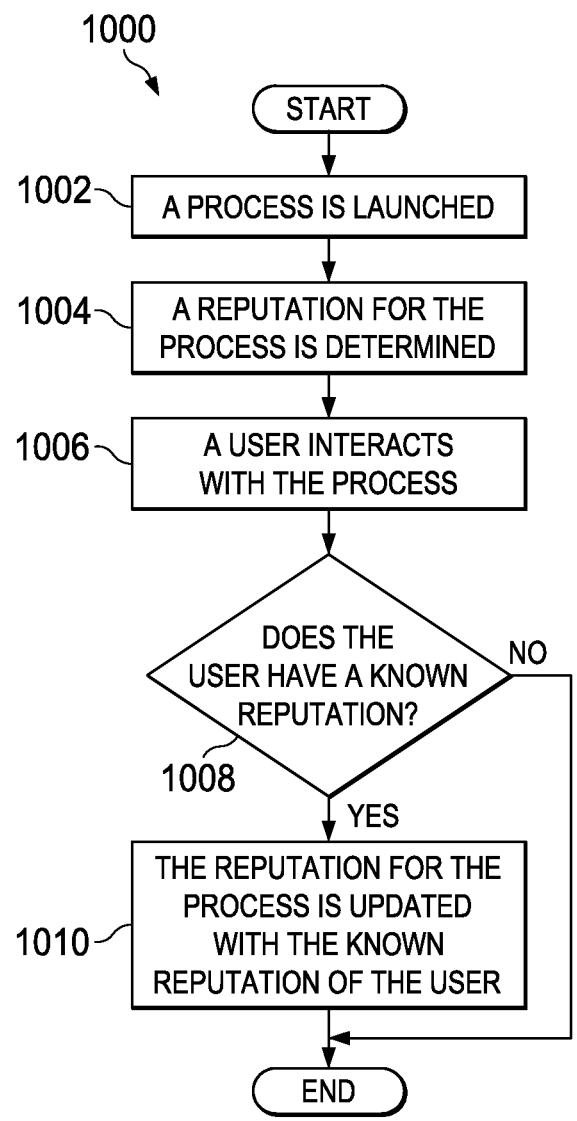
FIG. 10 is a simplified flowchart illustrating potential operations that may be associated with the communication system in accordance with an embodiment.

Turning to FIG. 10, FIG. 10 is an example flowchart illustrating possible operations of a flow 1000 that may be associated with determining a reputation for a process, in accordance with an embodiment. In an embodiment, one or more operations of flow 1000 may be performed by process reputation module 110. At 1102, a process in launched. At 1004, a reputation for the process is determined. At 1006, a user interacts with the process. At 1008, the system determines if the user has a known reputation. If the user does not have a known reputation, then the flow ends. If the user does have a known reputation, then the reputation for the process is updated with the known reputation of the user.

Figure 11:
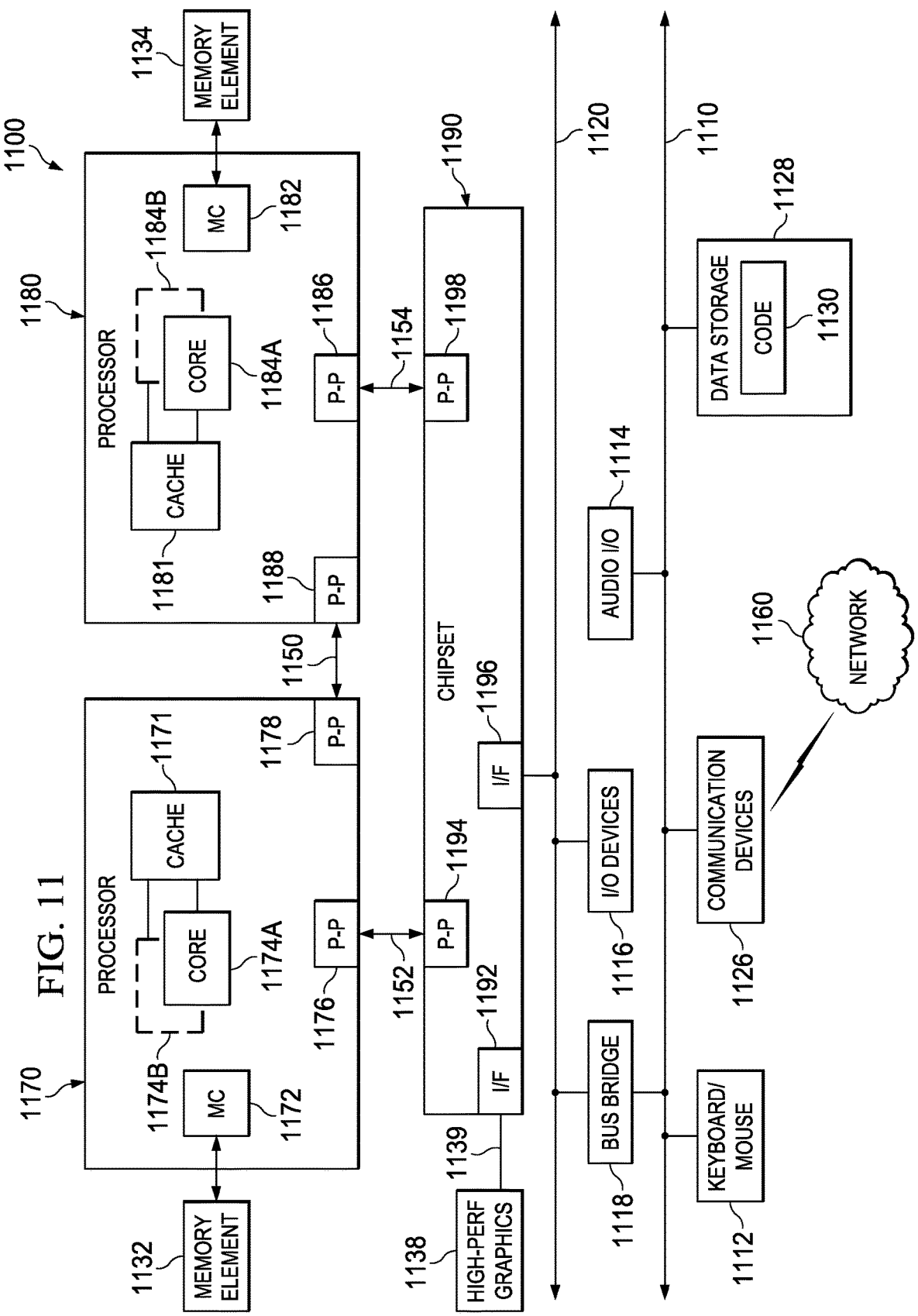
FIG. 11 is a block diagram illustrating an example computing system that is arranged in a point-to-point configuration in accordance with an embodiment.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the network elements of communication system 100 may be configured in the same or similar manner as computing system 1100.

As illustrated in FIG. 11, system 1100 may include several processors, of which only two, processors 1170 and 1180, are shown for clarity. While two processors 1170 and 1180 are shown, it is to be understood that an embodiment of system 1100 may also include only one such processor. Processors 1170 and 1180 may each include a set of cores (i.e., processor cores 1174A and 1174B and processor cores 1184A and 1184B) to execute multiple threads of a program. The cores may be configured to execute instruction code in a manner similar to that discussed above with reference to FIGS. 1-9. Each processor 1170, 1180 may include at least one shared cache 1171, 1181. Shared caches 1171, 1181 may store data (e.g., instructions) that are utilized by one or more components of processors 1170, 1180, such as processor cores 1174 and 1184.

Processors 1170 and 1180 may also each include integrated memory controller logic (MC) 1172 and 1182 to communicate with memory elements 1132 and 1134. Memory elements 1132 and/or 1134 may store various data used by processors 1170 and 1180. In alternative embodiments, memory controller logic 1172 and 1182 may be discrete logic separate from processors 1170 and 1180.

Processors 1170 and 1180 may be any type of processor and may exchange data via a point-to-point (PtP) interface 1150 using point-to-point interface circuits 1178 and 1188, respectively. Processors 1170 and 1180 may each exchange data with a chipset 1190 via individual point-to-point interfaces 1152 and 1154 using point-to-point interface circuits 1176, 1186, 1194, and 1198. Chipset 1190 may also exchange data with a high-performance graphics circuit 1138 via a high-performance graphics interface 1139, using an interface circuit 1192, which could be a PtP interface circuit. In alternative embodiments, any or all of the PtP links illustrated in FIG. 11 could be implemented as a multi-drop bus rather than a PtP link.

Chipset 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a keyboard/mouse 1112 (or other input devices such as a touch screen, trackball, etc.), communication devices 1126 (such as modems, network interface devices, or other types of communication devices that may communicate through a computer network 1160), audio I/O devices 1114, and/or a data storage device 1128. Data storage device 1128 may store code 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 12:
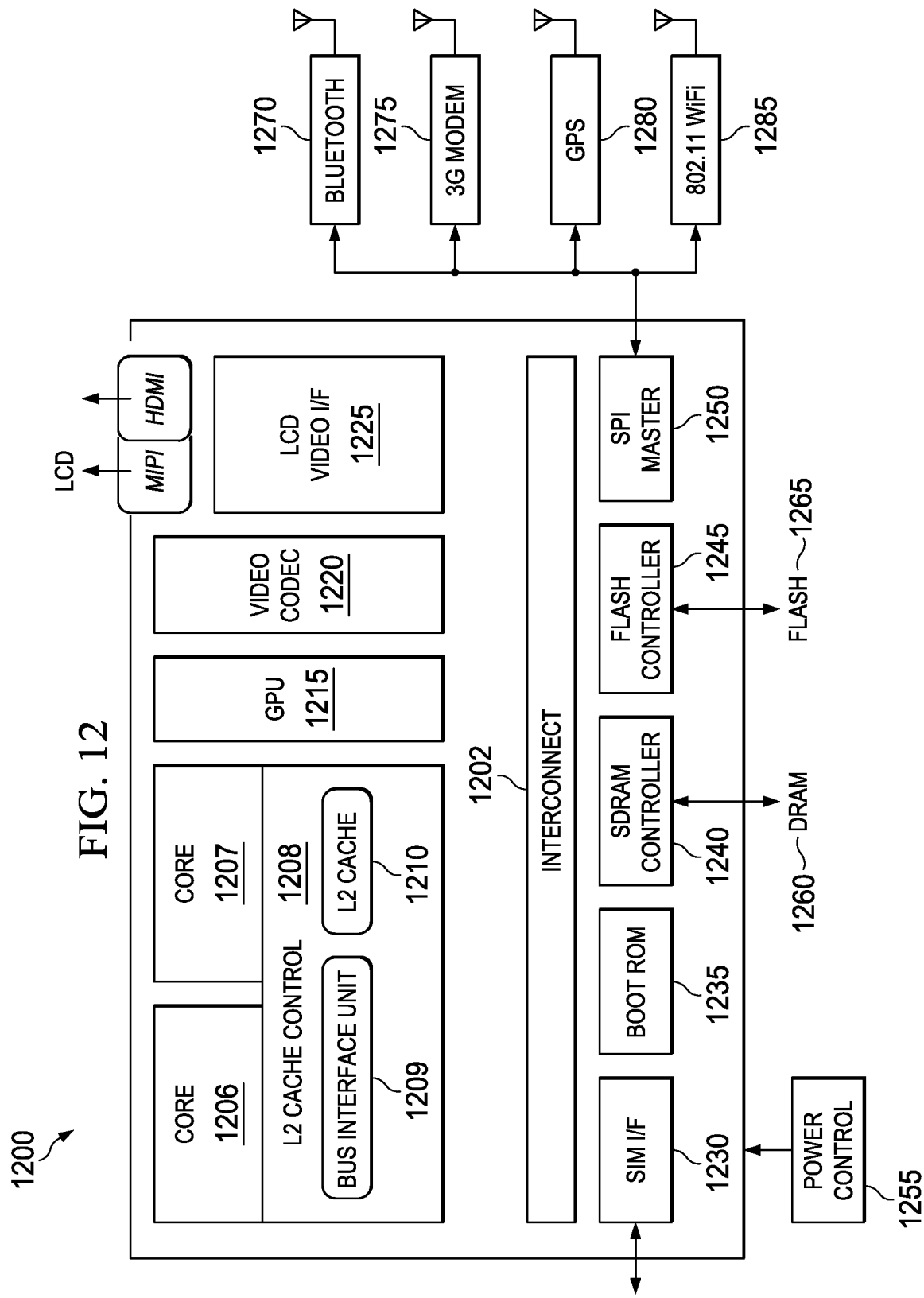
FIG. 12 is a simplified block diagram associated with an example ARM ecosystem system on chip (SOC) of the present disclosure.

Turning to FIG. 12, FIG. 12 is a simplified block diagram associated with an example ARM ecosystem SOC 1200 of the present disclosure. At least one example implementation of the present disclosure can include the reputation determination features discussed herein and an ARM component. For example, the example of FIG. 12 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 12, ARM ecosystem SOC 1200 may include multiple cores 1206-1207, an L2 cache control 1208, a bus interface unit 1209, an L2 cache 1210, a graphics processing unit (GPU) 1215, an interconnect 1202, a video codec 1220, and a liquid crystal display (LCD) I/F 1225, which may be associated with mobile industry processor interface (MIPI)/high-definition multimedia interface (HDMI) links that couple to an LCD.

ARM ecosystem SOC 1200 may also include a subscriber identity module (SIM) I/F 1230, a boot read-only memory (ROM) 1235, a synchronous dynamic random access memory (SDRAM) controller 1240, a flash controller 1245, a serial peripheral interface (SPI) master 1250, a suitable power control 1255, a dynamic RAM (DRAM) 1260, and flash 1265. In addition, one or more example embodiments include one or more communication capabilities, interfaces, and features such as instances of Bluetooth™ 1270, a 3G modem 1275, a global positioning system (GPS) 1280, and an 802.11 Wi-Fi 1285.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 13:
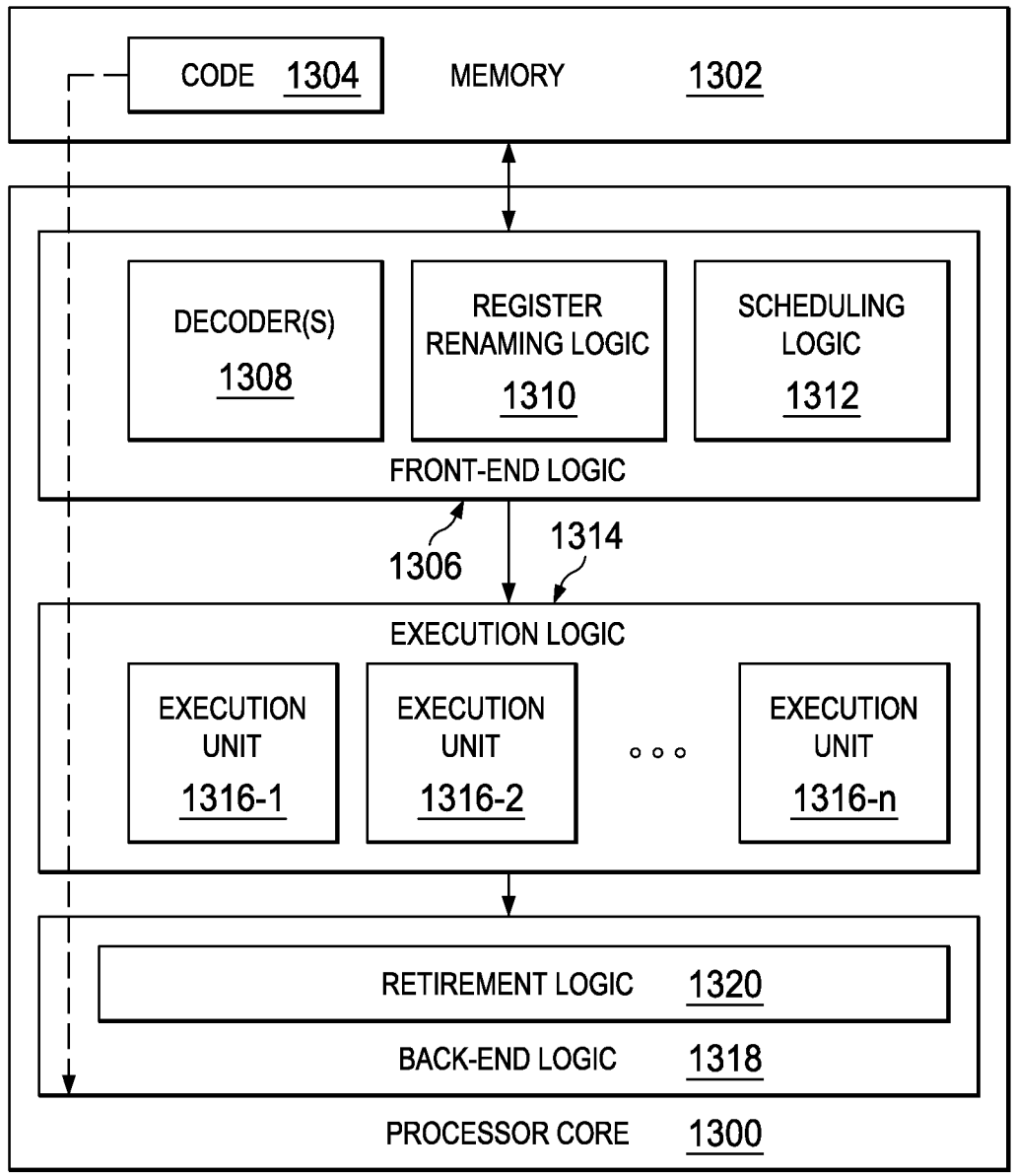
FIG. 13 is a block diagram illustrating an example processor core in accordance with an embodiment.

FIG. 13 illustrates a processor core 1300 according to an embodiment. Processor core 1300 may be the core for any type of processor, such as a micro-processor, an embedded processor, a digital signal processor (DSP), a network processor, or other device to execute code. Although only one processor core 1300 is illustrated in FIG. 13, a processor may alternatively include more than one of the processor core 1300 illustrated in FIG. 13. For example, processor core 1300 represents one example embodiment of processors cores 1074*a*, 1074*b*, 1074*a*, and 1074*b* shown and described with reference to processors 1070 and 1080 of FIG. 10. Processor core 1300 may be a single-threaded core or, for at least one embodiment, processor core 1300 may be multi-threaded in that it may include more than one hardware thread context (or "logical processor") per core.

FIG. 13 also illustrates a memory 1302 coupled to processor core 1300 in accordance with an embodiment. Memory 1302 may be any of a wide variety of memories (including various layers of memory hierarchy) as are known or otherwise available to those of skill in the art. Memory 1302 may include code 1304, which may be one or more instructions, to be executed by processor core 1300. Processor core 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor core 1300 can also include execution logic 1314 having a set of execution units 1316-1 through 1316-N. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor core 1300 allows out of order execution but requires in order retirement of instructions. Retirement logic 1320 may take a variety of known forms (e.g., re-order buffers or the like). In this manner, processor core 1300 is transformed during execution of code 1304, at least in terms of the output generated by the decoder, hardware registers and tables utilized by register renaming logic 1310, and any registers (not shown) modified by execution logic 1314.

Although not illustrated in FIG. 13, a processor may include other elements on a chip with processor core 1300, at least some of which were shown and described herein with reference to FIG. 10. For example, as shown in FIG. 10, a processor may include memory control logic along with processor core 1300. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication systems 100*a* and 100*b* as potentially applied to a myriad of other architectures.

It is also important to note that the operations in the preceding flow diagrams (i.e., FIGS. 3-10) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to identify a process, where the process includes executable code, assign a reputation to the process if the process has a known reputation, determine a reputation for the executable code, and combine the reputation for the executable code with the reputation assigned to the process to create a new reputation for the process.

In Example C2, the subject matter of Example C1 can optionally include where the one or more instructions that when executed by the at least one processor, further cause the processor to determine a reputation of a load library if the process includes a load library code and combine the reputation of the load library with the new reputation for the process to create a second new reputation for the process.

In Example C3, the subject matter of any one of Examples C1-C2 can optionally include where the one or more instructions that when executed by the at least one processor, further cause the processor to determine a reputation of a network element if the process communicates with the network element and combine the reputation of the network element with the new reputation for the process to create a second new reputation for the process.

In Example C4, the subject matter of any one of Examples C1-C3 can optionally include where the one or more instructions that when executed by the at least one processor, further cause the processor to determine a reputation of a content file if the process interprets the content file and combine the reputation of the content file with the new reputation for the process to create a second new reputation for the process.

In Example C5, the subject matter of any one of Examples C1-C4 can optionally include where the one or more instructions that when executed by the at least one processor, further cause the processor to determine a reputation of a thread if the thread is attached to the process and combine the reputation of the thread with the new reputation for the process to create a second new reputation for the process.

In Example C6, the subject matter of any one of Example C1-05 can optionally include where the one or more instructions that when executed by the at least one processor, further cause the processor to determine a reputation of an electronic device that includes the process and combine the reputation of the electronic device with the new reputation for the process to create a second new reputation for the process.

In Example C7, the subject matter of any one of Examples C1-C6 can optionally include where the one or more instructions that when executed by the at least one processor, further cause the processor to determine that the reputation of the electronic device has changed to a new reputation and combine the new reputation of the electronic device with the second new reputation for the process to create a third reputation for the process.

In Example C8, the subject matter of any one of Examples C1-C7 can optionally include where the one or more instructions that when executed by the at least one processor, further cause the processor to determine a reputation of the behavior of the process and combine the reputation of the behavior of the process with the new reputation for the process to create a second new reputation for the process.

In Example A1, an electronic device can include a process reputation module, where the process reputation module is configured to identify a process, where the process includes executable code, assign a reputation to the process if the process has a known reputation, determine a reputation for the executable code, and combine the reputation for the executable code with the reputation assigned to the process to create a new reputation for the process.

In Example, A2, the subject matter of Example A1 can optionally include where the process reputation module is further configured to determine a reputation of a load library if the process includes a load library code and combine the reputation of the load library with the new reputation for the process to create a second new reputation for the process.

In Example A3, the subject matter of any one of Examples A1-A2 can optionally include where the process reputation module is further configured to determine a reputation of a network element if the process communicates with the network element and combine the reputation of the network element with the new reputation for the process to create a second new reputation for the process.

In Example A4, the subject matter of any one of Examples A1-A3 can optionally include where the process reputation module is further configured to determine a reputation of a content file if the process interprets the content file and combine the reputation of the content file with the new reputation for the process to create a second new reputation for the process.

In Example A5, the subject matter of any one of Examples A1-A4 can optionally include where the process reputation module is further configured to determine a reputation of a thread if the thread is attached to the process and combine the reputation of the thread with the new reputation for the process to create a second new reputation for the process.

In Example A6, the subject matter of any one of Examples A1-A5 can optionally include where the process reputation module is further configured to determine a reputation of an electronic device that includes the process and combine the reputation of the electronic device with the new reputation for the process to create a second new reputation for the process.

In Example A7, the subject matter of any one of Examples A1-A6 can optionally include where the the process reputation module is further configured to determine that the reputation of the electronic device has changed to a new reputation and combine the new reputation of the electronic device with the second new reputation for the process to create a third reputation for the process.

In Example A8, the subject matter of any one of Examples A1-A7 can optionally include where the process reputation module is further configured to determine a reputation of the behavior of the process and combine the reputation of the behavior of the process with the new reputation for the process to create a second new reputation for the process.

Example M1 is a method including identifying a process, where the process includes executable code, assigning a reputation to the process if the process has a known reputation, determining a reputation for the executable code, and combining the reputation for the executable code with the reputation assigned to the process to create a new reputation for the process.

In Example M2, the subject matter of Example M1 can optionally include determining a reputation of a load library if the process includes a load library code and combining the reputation of the load library with the new reputation for the process to create a second new reputation for the process.

In Example M3, the subject matter of any one of the Examples M1-M2 can optionally include determining a reputation of a network element if the process communicates with the network element and combining the reputation of the network element with the new reputation for the process to create a second new reputation for the process.

In Example M4, the subject matter of any one of the Examples M1-M3 can optionally include determining a reputation of a content file if the process interprets the content file and combining the reputation of the content file with the new reputation for the process to create a second new reputation for the process.

In Example M5, the subject matter of any one of the Examples M1-M4 can optionally include determining a reputation of a thread if the thread is attached to the process and combining the reputation of the thread with the new reputation for the process to create a second new reputation for the process.

In Example M6, the subject matter of any one of the Examples M1-M5 can optionally include determining a reputation of an electronic device that includes the process and combining the reputation of the electronic device with the new reputation for the process to create a second new reputation for the process.

In Example M7, the subject matter of any one of the Examples M1-M6 can optionally include determining a reputation of the behavior of the process and combining the reputation of the behavior of the process with the new reputation for the process to create a second new reputation for the process.

Example S1 is system for determining the reputation of a process, the system including a process reputation module configured for identifying a process, where the process includes executable code, assigning a reputation to the process if the process has a known reputation, determining a reputation for the executable code, and combining the reputation for the executable code with the reputation assigned to the process to create a new reputation for the process.

In Example S2, the subject matter of Example S1 can optionally include the system is further configured for determining a reputation of a network element if the process communicates with the network element and combining the reputation of the network element with the new reputation for the process to create a second new reputation for the process.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory, computer-readable medium comprising one or more instructions that, when executed by at least one processor, cause the at least one processor to perform a method comprising:
   identifying a process, wherein the process includes executable code that interacts with an electronic device, and a reputation is assigned to the process;
   determining a reputation for the executable code;
   combining the reputation for the executable code and a reputation of the electronic device with the reputation assigned to the process to update the reputation for the process; and,
   in response to determining a thread is attached to the process by an actor process in order to bypass a firewall rule, merging the reputation assigned to the process and a reputation of the actor process or the thread to protect a resource of a computer.

2. The at least one non-transitory, computer-readable medium of claim 1, the method further comprising:
   combining a reputation of a loaded library with the reputation for the process, wherein the process includes executable code that interacts with the loaded library.

3. The at least one non-transitory, computer-readable medium of claim 1, the method further comprising:
   combining a reputation of a network element with the reputation for the process, wherein the process includes executable code that interacts with the network element.

4. The at least one non-transitory, computer-readable medium of claim 1, the method further comprising:
   combining a reputation of a content file with the reputation for the process, wherein the process includes executable code that interacts with the content file.

5. The at least one non-transitory, computer-readable medium of claim 1, the method further comprising:
   combining the reputation of the thread with the reputation for the process.

6. The at least one non-transitory, computer-readable medium of claim 1, the method further comprising:
   determining that the reputation of the electronic device has changed to a new reputation; and
   combining the new reputation of the electronic device with the reputation for the process.

7. The at least one non-transitory, computer-readable medium of claim 1, the method further comprising:
   determining a reputation of a behavior of the process; and
   combining the reputation of the behavior of the process with the reputation for the process.

8. The at least one non-transitory, computer-readable medium of claim 1, wherein the reputation for the process is determined based on a whitelist or a blacklist.

9. An apparatus, comprising:
   a processor configured to
      identify a process, wherein the process includes executable code that interacts with an electronic device, and a reputation is assigned to the process;
      determine a reputation for the executable code;
      combine the reputation for the executable code and a reputation of the electronic device with the reputation assigned to the process to update the reputation for the process; and,
      in response to determining a thread is attached to the process by an actor process in order to bypass a firewall rule, merge the reputation assigned to the process and a reputation of the actor process or the thread to protect a resource of a computer.

10. The apparatus of claim 9, wherein the processor is further configured to:
combine a reputation of a loaded library with the reputation for the process, wherein the process includes executable code that interacts with the loaded library.

11. The apparatus of claim 9, wherein the processor is further configured to:
combine a reputation of a network element with the reputation for the process, wherein the process includes executable code that interacts with the network element.

12. The apparatus of claim 9, wherein the processor is further configured to:
combine a reputation of a content file with the reputation for the process, wherein the process includes executable code that interacts with the content file.

13. The apparatus of claim 9, wherein the processor is further configured to:
combine the reputation of the thread with the reputation for the process, wherein the process includes executable code that interacts with the thread.

14. The apparatus of claim 9, wherein the processor is further configured to:
determine that the reputation of the electronic device has changed to a new reputation; and
combine the new reputation of the electronic device with the reputation for the process.

15. The apparatus of claim 9, wherein the processor is further configured to:
determine a reputation of a behavior of the process; and
combine the reputation of the behavior of the process with the reputation for the process.

16. The apparatus of claim 9, wherein the reputation for the process is determined based on a whitelist or a blacklist.

17. A method, comprising:
identifying a process, wherein the process includes executable code that interacts with an electronic device, and a reputation is assigned to the process;
determining a reputation for the executable code;
combining the reputation for the executable code and a reputation of the electronic device with the reputation assigned to the process to update the reputation for the process; and,
in response to determining a thread is attached to the process by an actor process in order to bypass a firewall rule, merging the reputation assigned to the process and a reputation of the actor process or the thread to protect a resource of a computer.

18. The method of claim 17, further comprising:
combining a reputation of a loaded library with the reputation for the process, wherein the loaded library interacts with executable code included in the process.

19. The method of claim 17, further comprising:
combining a reputation of a network element with the reputation for the process, wherein the process includes executable code that interacts with the network element.

20. The method of claim 17, further comprising:
combining a reputation of a content file with the reputation for the process, wherein the process includes executable code that interacts with the content file.

21. The method of claim 17, further comprising:
combining the reputation of the thread with the reputation for the process.

22. The method of claim 17, further comprising:
determining a reputation of a behavior of the process; and
combining the reputation of the behavior of the process with the reputation for the process.

23. A system for determining a reputation of a process, the system comprising:
a memory including instructions; and
a processor that executes the instructions to become configured for
identifying the process, wherein the process includes executable code that interacts with an electronic device, and the reputation is assigned to the process;
determining a reputation for the executable code;
combining the reputation for the executable code and a reputation of the electronic device with the reputation assigned to the process to update the reputation for the process; and,
in response to determining a thread is attached to the process by an actor process in order to bypass a firewall rule, merging the reputation assigned to the process and a reputation of the actor process or the thread to protect a resource of a computer.

24. The system of claim 23, wherein the system is further configured for:
combining a reputation of a network element with the reputation for the process, wherein the process includes executable code that interacts with the network element.

25. The system of claim 23, wherein the reputation for the process is determined based on a whitelist or a blacklist.

* * * * *

UNITED STATES PATENT AND TRADEMARK OFFICE
CERTIFICATE OF CORRECTION

PATENT NO. : 10,834,109 B2
APPLICATION NO. : 14/581439
DATED : November 10, 2020
INVENTOR(S) : Joel R. Spurlock Page 1 of 1

It is certified that error appears in the above-identified patent and that said Letters Patent is hereby corrected as shown below:

In the Claims

In Column 17, Lines 20-21, in Claim 13, delete "process, wherein the process includes executable code that interacts with the thread." and insert -- process. --, therefor.

Signed and Sealed this
Twelfth Day of January, 2021

Andrei Iancu
*Director of the United States Patent and Trademark Office*